(12) United States Patent
Nakajima et al.

(10) Patent No.: US 8,627,990 B2
(45) Date of Patent: Jan. 14, 2014

(54) ELECTRICAL ACCESSORY MOUNTING DEVICE FOR A SADDLE-TYPE VEHICLE

(75) Inventors: Shoichi Nakajima, Wako (JP); Shizuo Kawano, Asaka (JP); Yoshifumi Oe, Niiza (JP)

(73) Assignee: Honda Motor Co., Ltd, Tokyo (JP)

( * ) Notice: Subject to any disclaimer, the term of this patent is extended or adjusted under 35 U.S.C. 154(b) by 150 days.

(21) Appl. No.: 13/052,823

(22) Filed: Mar. 21, 2011

(65) Prior Publication Data

US 2011/0233250 A1  Sep. 29, 2011

(30) Foreign Application Priority Data

Mar. 26, 2010 (JP) ................................. 2010-072979

(51) Int. Cl.
*B60R 11/00* (2006.01)

(52) U.S. Cl.
USPC ........... 224/420; 224/548; 224/553; 224/555; 224/556

(58) Field of Classification Search
USPC ......... 224/420, 545, 546, 547, 548, 550, 562, 224/559, 553, 555, 556
See application file for complete search history.

(56) References Cited

U.S. PATENT DOCUMENTS

| 4,368,866 | A | * | 1/1983 | Urban | 248/286.1 |
| 5,109,411 | A | * | 4/1992 | O'Connell | 379/454 |
| 6,561,400 | B2 | * | 5/2003 | Lee | 224/413 |

FOREIGN PATENT DOCUMENTS

| JP | 9-156560 A | 6/1997 |
| JP | 11-87937 A | 3/1999 |
| JP | 2001-239896 A | 9/2001 |

* cited by examiner

*Primary Examiner* — Adam Waggenspack
(74) *Attorney, Agent, or Firm* — Westerman, Hattori, Daniels & Adrian, LLP (57) ABSTRACT

There is provided an electrical accessory mounting device capable of adjusting an electrical accessory to the position viewable from a rider. The mounting device of the navigation apparatus 20 mounted on the steering stem pipe 3 of the saddle-type vehicle 1 comprises the fixture 4 mounted on the saddle-type vehicle 1, the bracket 5 holding the navigation apparatus 20, and the angular setting means 37 making at least part of the bracket 5 movable to the fixture 4 in the longitudinal direction of the saddle-type vehicle 1 and setting an angle of the bracket 5 to a predetermined angle by the position corresponding to the movement of the bracket 5. The angular setting means 37 includes a pair of long holes 34, 35 provided on the fixture 4 and a pair of screws 36F, 36B moving along a pair of long holes 34, 35 provided on the bracket 5. Thus, the angle of the navigation apparatus 20 can be adjusted by back-and-forth movement of the bracket 5, thereby allowing the electrical accessory to be adjusted to an easily viewable position where other members do not interfere.

10 Claims, 12 Drawing Sheets

ELECTRICAL ACCESSORY MOUNTING DEVICE FOR A SADDLE-TYPE VEHICLE

BACKGROUND OF THE INVENTION

1. Field of the Invention

The present invention is related to an electrical accessory mounting device for a saddle-type vehicle.

2. Description of the Related Art

Conventionally, U.S. Pat. No. 6,378,815, for example, discloses this kind of mounting device where a shaft is inserted into a steering stem pipe and then fixed thereto, and a plate is pivotally provided on an upper section of the shaft, and an electrical accessory such as a radar detector is detachably provided on the plate.

Further, Japanese Patent Registered Publication No. 3608753, for example, discloses an electrical accessory mounting device for a two-wheeled vehicle which comprises a fixture mounted on a steering portion or a tank of a two-wheeled vehicle and a supporting portion supporting an electrical accessory, where the fixture is provided on a center line of a two-wheeled vehicle body extending in the longitudinal direction of the two-wheeled vehicle; and the supporting portion is so mounted on the fixture that it can pivot about a lateral axis of the fixture and is clamped to be fixed to a handle bar by screwing an upper fastener into a lower fastener and then tightening them with a bolt, thus allowing the bolt to fix the fixture.

According to the mounting devices mentioned above, there is a concern about the degraded visibility of indicators such as a speed meter, a turn signal indicator, and a display of gear-position, since the electrical accessory is mounted on the upper section of a steering portion.

Furthermore, according to the foregoing structure which allows the supporting portion to pivot about the lateral axis of the fixture as disclosed in the latter prior art relating to the above electrical accessory mounting device for a two-wheeled vehicle, when a mounting position is lowered, the supporting portion must be arranged upward away from a fastener or the like because the electrical accessory is easy to contact the fastener in pivoting the supporting portion downward. Moreover, in the cast that there is one rotating axis at the rear side of the electrical accessory, then there will exist the only one position where the electrical accessory squarely faces a rider, and practically, the position and angle need to be adjusted with a view to avoiding glaring reflection of the sun light and interference with indicators of the two-wheeled vehicle.

Meanwhile, a mounting device with a bag for a navigation apparatus provided on a fuel tank has conventionally been proposed. However, it is difficult for a rider to visually check the navigation apparatus while riding a two-wheeled vehicle because the navigation apparatus is arranged along the fuel tank and thus the rider must look down at the navigation apparatus.

SUMMARY OF THE INVENTION

Accordingly, in view of the problems above, it is an object of the present invention to provide an electrical accessory mounting device for a saddle-type vehicle capable of adjusting the position of the electrical accessory such that a rider can easily check the electrical accessory visually.

In order to achieve the object, the present invention according to a first aspect of the invention provides an electrical accessory mounting device for a saddle-type vehicle to mount the electrical accessory on a steering member of the saddle-type vehicle or its vehicle body in front of a seat thereof, comprising: a fixture mounted on the saddle-type vehicle; a holding portion holding the electrical accessory; and an angular setting means making at least part of said holding portion movable relative to said fixture in a longitudinal direction of the saddle-type vehicle, and setting an angle of said holding portion to a predetermined angle according to a position corresponding to the movement of said holding portion in the longitudinal direction.

According to the electrical accessory mounting device for a saddle-type vehicle according to a second aspect of the present invention, said angular setting means is structured such that said angular setting means allows said holding portion to move in parallel or an upper section thereof to rotate rearwardly of the vehicle when said holding portion is moved from back to front.

According to the electrical accessory mounting device for a saddle-type vehicle according to third and fourth aspects of the present invention, said angular setting means comprises a pair of guides provided on one of said fixture and said holding portion, and a pair of movement portions provided on the other of said fixture and said holding portion, said movement portions moving along a pair of said guides.

According to the electrical accessory mounting device for a saddle-type vehicle according to fifth and sixth aspects of the present invention, said guide is a long hole while said movement portion is a screw movable along said long hole.

According to the electrical accessory mounting device for a saddle-type vehicle according to seventh to tenth aspects of the present invention, a pair of said guides are arranged in the crossing directions.

According to the electrical accessory mounting device for a saddle-type vehicle according to an eleventh aspect of the present invention, the electrical accessory mounting device for a saddle-type vehicle comprises: a fixture mounted on a fuel tank of the saddle-type vehicle with a tank bag, and a holding portion holding the electrical accessory, said holding portion being movable relative to said tank bag in a longitudinal direction of the saddle-type vehicle so that it may come in and out of a front of said tank bag.

According to the electrical accessory mounting device for a saddle-type vehicle according to a twelfth aspect of the present invention, said holding portion comprises a sliding member movable in the longitudinal direction of the vehicle relative to said tank bag.

According to the first aspect of the present invention, the mounting device is able to set an angle of said holding portion to a predetermined angle by movement of said holding portion, thus allowing the electrical accessory to be adjusted to an easily viewable position where other members do not interfere.

According to the second aspect of the present invention, the mounting device is able to adjust the position and angle of the electrical accessory by moving the electrical accessory either in parallel or from back to front so as to rotate the electrical accessory.

According to the third and fourth aspects of the present invention, the mounting device is able to set the angle of the holding portion by engaging the guides with the movement portions.

According to the fifth and sixth aspects of the present invention, the mounting device is able to set the angle of the holding portion by a simple structure in which the long hole and the screw are engaged with each other.

According to the seventh to tenth aspects of the present invention, the mounting device is able to set the angle of the holding portion while allowing the holding portion to move, since a pair of said guides are arranged in the crossing directions.

According to the eleventh aspect of the present invention, the mounting device enables the electrical accessory to be housed in the tank bag when the holding portion is retracted backward, while it enables the electrical accessory to be viewed and used by taking the electrical accessory out from the front of the tank bag when the holding portion is advanced to the front.

According to the twelfth aspect of the present invention, the mounting device enables the electrical accessory to come in and out from the tank bag by sliding the holding portion.

DETAILED DESCRIPTION OF THE PREFERRED EMBODIMENTS

As follows is a detailed description of preferred embodiments of the present invention with reference to the appended drawings.

First Embodiment

As shown in FIG. 1 to FIG. 5, an electrical accessory mounting device of the present embodiment comprises: a steering stem pipe 3 located at the substantial rotational center of a steering portion 2 for a saddle-type vehicle 1 as a two-wheeled vehicle; a metallic fixture 4 fixed on the steering stem pipe 3; and a bracket 5 as a holding portion provided on the fixture 4 in such a manner that the position of the bracket 5 can be adjusted.

Figure 2:
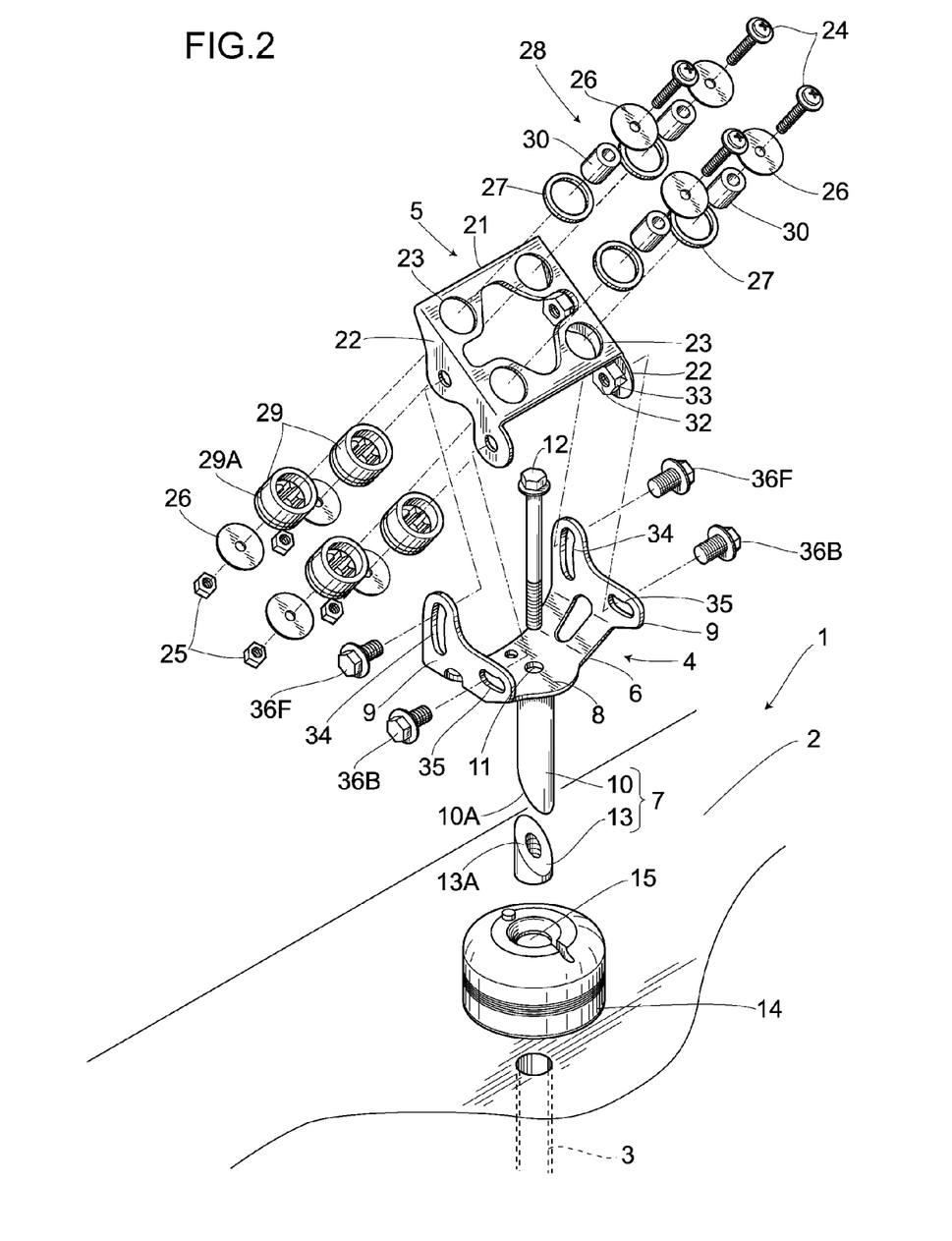
FIG. 2 is an exploded perspective view of the device according to the first embodiment.

The fixture 4 includes a receiving portion 6 receiving the bracket 5 in a position-adjustable manner and an insertion portion 7 which is inserted into the steering stem pipe 3 and then fixed thereto. The receiving portion 6 and the insertion portion 7 are metallic.

The receiving portion 6 has a side plate 9 on both lateral sides of a base 8 and is formed in a U-shape whose upper portion is open. Further, the insertion portion 7 includes an insertion pipe 10 integrally formed on the base 8 at the center of the bottom face thereof. The base 8 has a through-hole 11 drilled at the center thereof so that the through-hole 11 is communicated with the insertion pipe 10. From the through-hole 11, a long bolt 12 is inserted into the insertion pipe 10. The inner diameter of the insertion pipe 10 is approximately half the outer diameter thereof such that its pipe wall is formed thick. The insertion pipe 10 has an inclined surface 10A obliquely formed at the lower end thereof. At the bottom of the insertion pipe 10, there is provided a nut body 13 connected thereto by the long bolt 1. At an upper portion of the nut body 13, there is provided an inclined surface 13A that is formed so as to correspond to the inclined surface 10A. These inclined surfaces 10A, 13A are each at approximately 45 degrees relative to the center axis of the insertion pipe 10. Furthermore, the outer diameters of the insertion pipe 10 and the nut body 13 are slightly smaller than the inner diameter of the steering stem pipe 3, thereby allowing them to be inserted into the steering stem pipe 3.

In the drawing, numeral 14 designates a cylindrical cover body covering the upper portion of the steering stem pipe 3. The cover body 14 has a top face and is made of an elastic member. At the center of the top face of the cover body 14, there is provided an insertion hole 15 into which the insertion pipe 10 and the nut body 13 are inserted. The cover body 14 is provided as needs arise.

Figure 4:
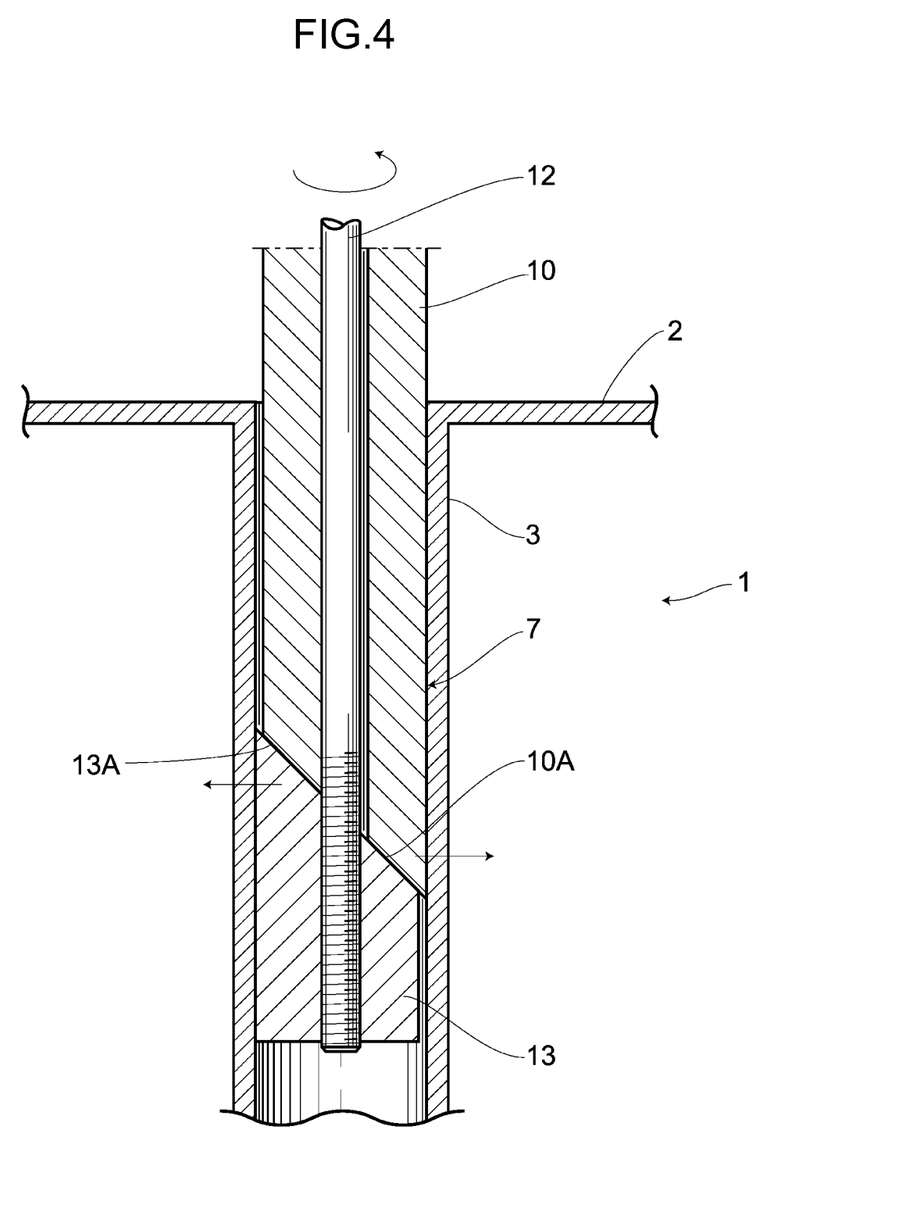
FIG. 4 is a cross-section view showing an insertion portion inside a steering stem pipe according to the first embodiment.

Then, with the nut body 13 being temporarily fixed to the insertion pipe 10 by the long bolt 12 after allowing the inclined faces 10A, 13A to mate with each other, the insertion pipe 10 and the nut body 13 are inserted into the steering stem pipe 3 from the top open thereof, followed by the adjustment of the height of the fixture 4 and the orientation thereof to the longitudinal direction of the vehicle 1. Specifically, the orientation of the side plates is adjusted so as to coincide with the longitudinal direction of the vehicle 1. After that, as shown in FIG. 4, the inclined surfaces 10A, 13A are pressed against each other by further screwing the long bolt 12 into the nut body 13. Through a so-called wedge effect, on the one hand, the lower end of the inclined surface 10A is allowed to slightly move toward the inner surface of the steering stem pipe 3; on the other, the upper end of the inclined surface 13A is allowed to slightly move toward the inner surface thereof. As a result, the inclined surfaces 10A, 13A are each pressed onto the inner wall of the insertion pipe 10, thereby allowing the fixture 4 to be fixed to the steering stem pipe 3.

Next, the bracket 5 is described in detail. The bracket 5 comprises an attachment portion 21 attaching a navigation apparatus 20 thereto and side plates 22, 22 provided integrally with the attachment portion 21 on the lateral sides thereof. The bracket 5 has an inverted U-shape whose lower portion is open. These side plates 22, 22 are inserted between the side plates 9, 9 of the fixture 4. Note that the attachment portion 21 and the side plates 22, 22 are metallic. Further, the navigation apparatus 20 comprises a navigation display 20A displaying navigational information such as a destination and current vehicle position, a controller controlling the navigation display 20A, and an operation portion for a user to perform an input operation to the controller.

Figure 3:
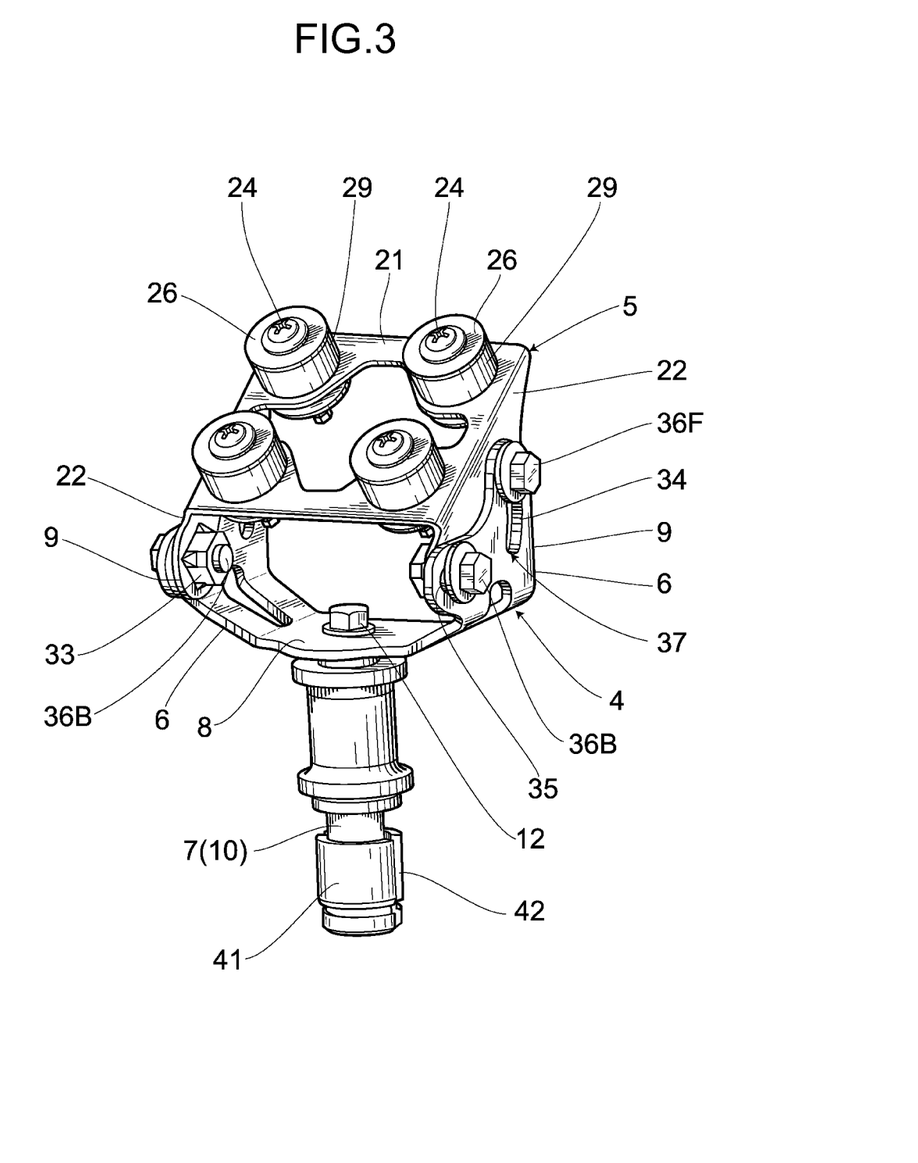
FIG. 3 is a perspective view of the device prior to mounting the electrical accessory thereto according to the first embodiment.

A plurality of attachment holes 23 (more than three holes; in this embodiment, four holes) are drilled in the attachment portion 21. In each attachment hole 23, an elastic cylindrical body 29 is fixed thereto by an attachment member 28 including a bolt 24, nut 25, washer 26, collar 27 and so on. The elastic cylindrical body 29 includes a hard inner cylindrical body 30 thereinside. An attachment 31 for the navigation apparatus 20 is fixed on a front of the elastic cylindrical body 29 with the former abutting on the latter. Further, a fitting groove 29A is provided around the periphery of a rear portion of the elastic cylindrical body 29 so that it engages with the attachment hole 23. In addition, FIG. 3 shows the device prior to mounting the attachment 31.

The navigation apparatus 20 can be mounted on the attachment 31 in a snap-on manner. On the contrary, the navigation apparatus 20 can be removed by operating an operation portion not shown in the drawings.

The side plates 22, 22 of the bracket 5 are formed with female screw holes 32, 32 provided on the front and the rear thereof at a certain interval. The female screw hole 32 is composed of a nut 33 fixed on the inside surface of the side plate 22. Further, long holes 34, 35 serving as guides are formed on the front and rear of the side plate 9 of the fixture 4 so as to correspond to the female screw holes 32, 32. Into the front-side long hole 34 is inserted a front-side screw 36F as a front-side movement portion, and then the front-side screw 36F is screwed into the corresponding female screw hole 32. Similarly, into the rear-side long hole 35 is inserted a rear-side screw 36B as a rear-side movement portion, and then the rear-side screw 36B is screwed into the corresponding female screw hole 32. In this way, the front-side screw 36F and the rear-side screw 36B, serving as lateral shafts, become movable within the front-side long hole 34 and the rear-side long hole 35, respectively. Incidentally, the front-side long hole 34 is formed longer than the rear-side long hole 35 in this embodiment.

Thus, the navigation apparatus 20 is mounted on a steering member of the vehicle 1 or a front side of the vehicle body. In this embodiment, the navigation apparatus 20 is mounted on the steering stem pipe 3 which constitutes a part of the steering member.

These front-side long hole 34, rear-side long hole 35, front-side screw 36F and rear-side screw 36B constitute an angular setting means 37 so that it may be used to adjust an angle of the bracket 5 through the back-and forth movement of the front-side screw 36F and the rear-side screw 36B within the long holes 34, 35 respectively.

Figure 1:
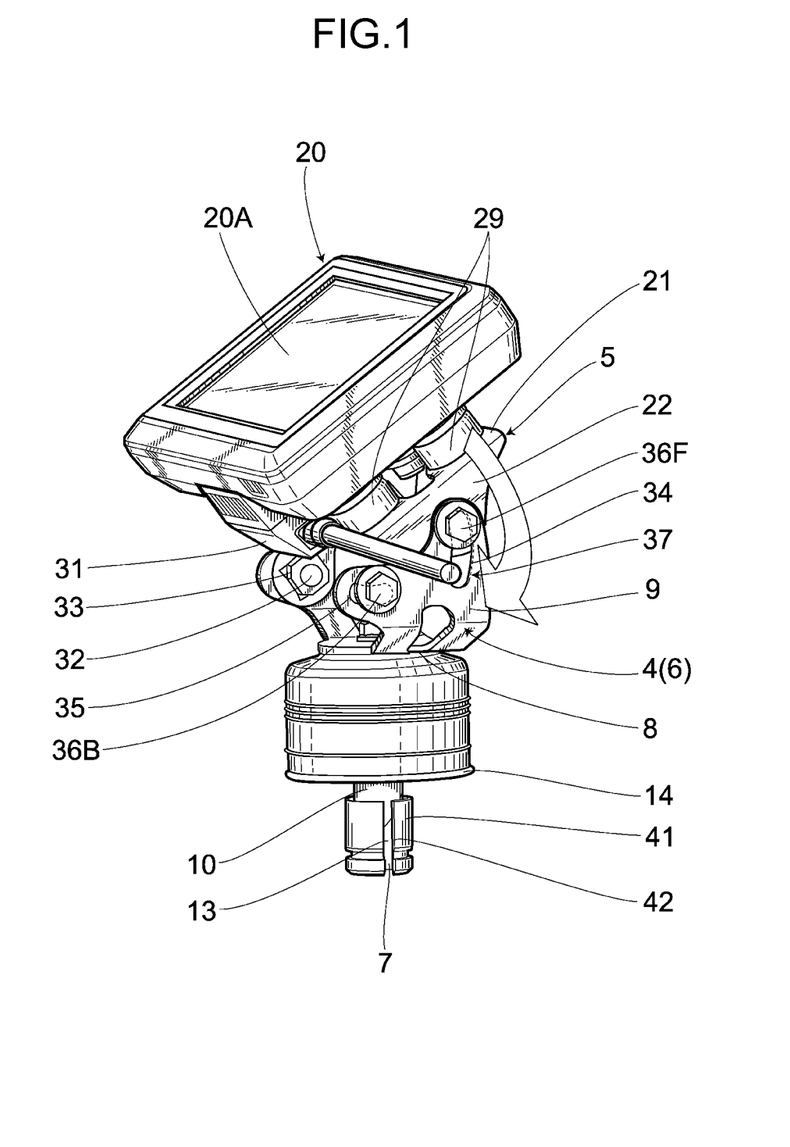
FIG. 1 is a perspective view of an electrical accessory mounting device for a saddle-type vehicle according to a first embodiment of the present invention.

According to the present embodiment, the front-side long hole 34 is substantially vertically elongated, while the rear-side long hole 35 is substantially horizontally elongated, and both of the long holes 34, 35 are formed in a substantially circular arc shape. And then, the front-side screw 36F is allowed to move within the front-side long hole 34, and the rear-side screw 36B to move within the rear-side long hole 35. Thus, as shown in FIG. 1, when the rear-side screw 36B moves backward from the front end of the rear-side long hole 35 within the rear-side long hole 35, the front-side screw 36F moves downward from the upper end of the front-side long hole 34 within the front-side long hole 34, thereby allowing the navigation apparatus 20 to rotate in such a manner that the upper part of the display 20A of the navigation apparatus 20 moves downward. Conversely, when the lower part of the bracket 5 moves forward, the upper part of the navigation apparatus 20 rotates backward, thereby allowing the navigation apparatus 20 to stand upright.

As described above, according to the present embodiment, the bracket 5 serving as a holding portion is set at a predetermined angle by allowing the front-side screw 36F and the rear-side screw 36B to move within the front-side long hole 34 and the rear-side long hole 35, respectively, unlike the prior art where an electrical accessory has a singe rotational center on the rearside thereof. Accordingly, the navigation apparatus 20 can be adjusted at the position and angle suitable for use conditions because the navigation apparatus 20 as an electrical accessory faces squarely to the rider even when the bracket 5 moves back and forth or up and down during the adjustment thereof.

Figure 5:
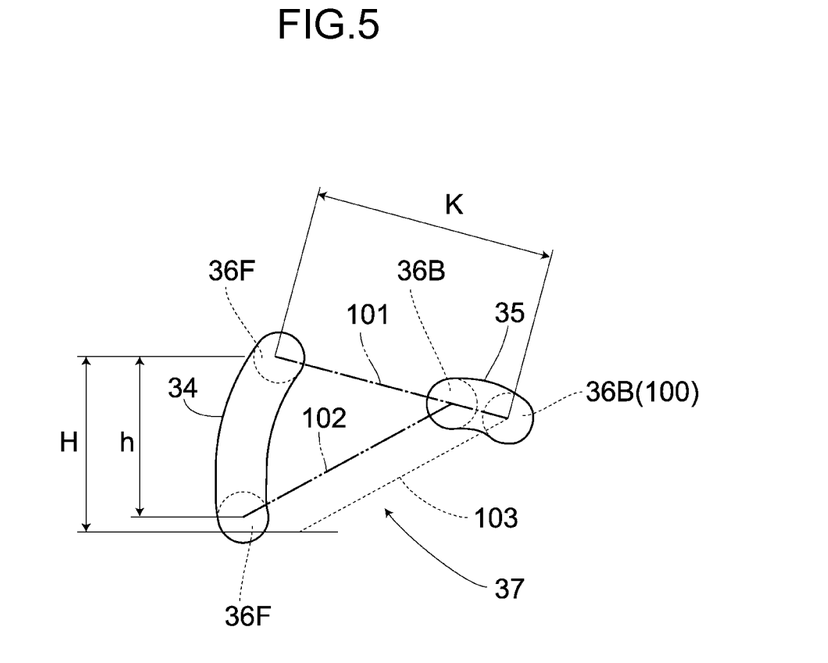
FIG. 5 is an explanatory view to explain a function of an angle setting means according to a modification of the first embodiment.

Next, the difference between the two-axis-sliding system using the front-side screw 36F and the rear-side screw 36B according to the present embodiment and the conventional system in which rotation takes place about only one axis is described below with reference to FIG. 5. In FIG. 5, the center of the rear-side screw 36B at the rear end of the rear-side long hole 35 and the center of the front-side screw 36F at the upper-end of the front-side long hole 34 are connected with each other via a pre-rotation imaginary line 101. An angle of the imaginary line 101 to the horizontal direction corresponds to the angle of the navigation apparatus 20. Note that the length of the imaginary line 101 corresponds to an interval K between the front-side screw 36F and the rear-side screw 36B. Also, the position of the rear-side screw 36B at the rear end of the rear-side long hole 35 is assumed to correspond to a center axis 100 of the prior art in which rotation takes place about only one axis. Accordingly, the imaginary line 101 is common to the present embodiment and the prior art. Here, a post-rotation imaginary line 102 is defined as a line connecting between positions of the front-side screw 36F and the rear-side screw 36B after the front-side screw 36F moves to the lower end of the front-side long hole 34 and the rear-side screw 36B moves to the front end of rear-side long hole 35. Also, a post-rotation imaginary line 103 is defined as a line rotated about the center axis 100 by the same angle as that between the pre-rotation imaginary line 101 and the post-rotation imaginary line 102. As is clearly shown from the illustrations of these imaginary lines 102 and 103, the rotation about the fixed center axis 100 requires a height H, while the rotation by the two-axis-sliding system requires a height h, thereby demonstrating that using the two-axis-sliding system enables the reduction of a vertical space required for rotation of the navigation apparatus 20 when rotating it by the same angle. Incidentally, FIG. 5 is only shown by way of explanation of function, and relative positions of the long holes 34, 35 are unchanged between FIG. 1 and FIG. 5.

In FIG. 1 and FIG. 3, numeral 41 designates a cylindrical spacer provided on a seam between the insertion pipe 10 and the nut body 13. The spacer 41 is provided with a vertical groove 42 extending over an entire length thereof in the longitudinal direction, and the outer diameter of the spacer 41 corresponds to the inner diameter of the steering stem pipe 3. Accordingly, when the long bolt 12 is screwed into the nut body 13, both of the inclined surfaces 10A, 13A are pressed against each other, and due to the wedge effect at that time, the lower end of the inclined surface 10A is allowed to move slightly outwardly toward the inner surface of the steering stem pipe 3, while the upper end of the inclined surface 13A is allowed to move slightly outwardly toward the inner surface thereof. Thus, the spacer 41 having the vertical groove 42 is expanded, and the outer circumference of the spacer 41 is pressed to the inner of the steering stem pipe 3. As a result, the fixture 4 is fixed onto the steering stem pipe 3. In this way, the same insertion pipe 10 and the nut body 13 can be used for a steering stem pipe 3 having various diameters.

As described above, according to the first aspect of the present invention, the electrical accessory mounting device for a saddle-type vehicle 1 to mount the navigation apparatus 20 as an electrical accessory to the steering stem pipe 3 as a steering member of the saddle-type vehicle comprising: the fixture 4 mounted on the saddle-type vehicle 1; the bracket 5 as a holding portion holding the electrical accessory 20; and the angular setting means 37 making at least part of the bracket 5 movable relative to the fixture 4 in the longitudinal direction of the saddle-type vehicle 1 and setting an angle of the bracket 5 to a predetermined angle according to a position corresponding to the movement of the bracket 5 in the longitudinal direction. Thus, the mounting device of the present embodiment is able to set the angle of the bracket 5 to a predetermined angle by the back-and-forth movement of the bracket 5, and thus allowing the electrical accessory 20 to be adjusted to an easily viewable position where other members do not interfere.

According to the second aspect, the angular setting means 37 is structured such that the upper section of the bracket 5 rotates rearwardly of the vehicle 1 when the bracket 5 as a holding portion moves from back to front. Thus, the mounting device is able to adjust the position and angle of the navigation apparatus 20 by rotating the navigation apparatus 20 in backward.

According to the third and fourth aspects, the angular setting means 37 comprises a pair of long holes 34, 35 as guides provided on the fixture 4 as one of the fixture 4 and the bracket 5, and a pair of screws 36F, 36B moving along a pair of long holes 34, 35 and being provided on the bracket 5 as the other of the fixture 4 and the bracket 5. Thus, the mounting device is able to set the angle of the bracket 5 by engaging the long holes 34, 35 with the screws 36F, 36B.

According to the fifth and sixth aspects, since guides are long holes 34, 35 while movement portions are screws 36F, 36B moving along the long holes 34, 35, the mounting device is able to set the angle of the bracket 5 using a simple structure in which the long holes 34, 35 and the screws 36F, 36B are engaged.

According to the seventh to tenth aspects, since a pair of the long holes 34, 35 as guides are arranged in the crossing directions respectively, the mounting device is able to allow the bracket 5 as a holding portion to move along the long holes 34, 35 and set the angle thereof.

Specifically, according to the present embodiment, since the inclined surface 10A is formed on the lower end of the insertion pipe 10, and the inclined surface 13A corresponding to the inclined surface 10A is formed on the upper end of the nut body 13, and the mounting device of the present invention has a swage fixing means expanding outward by pressing both of the inclined surfaces 10A, 13A using the long bolt 12 as a screwing means, the navigation apparatus 20 can be easily mounted on the steering stem pipe 3 by adjusting the height and orientation of the fixture 4. Moreover, since the bracket 5 is provided with the elastic cylindrical body 29 arranged between the attachment portion 21 of the bracket 5 and the navigation apparatus 20, the effect of vibration against the navigation apparatus 20 can be reduced.

Second Embodiment

Figure 6:
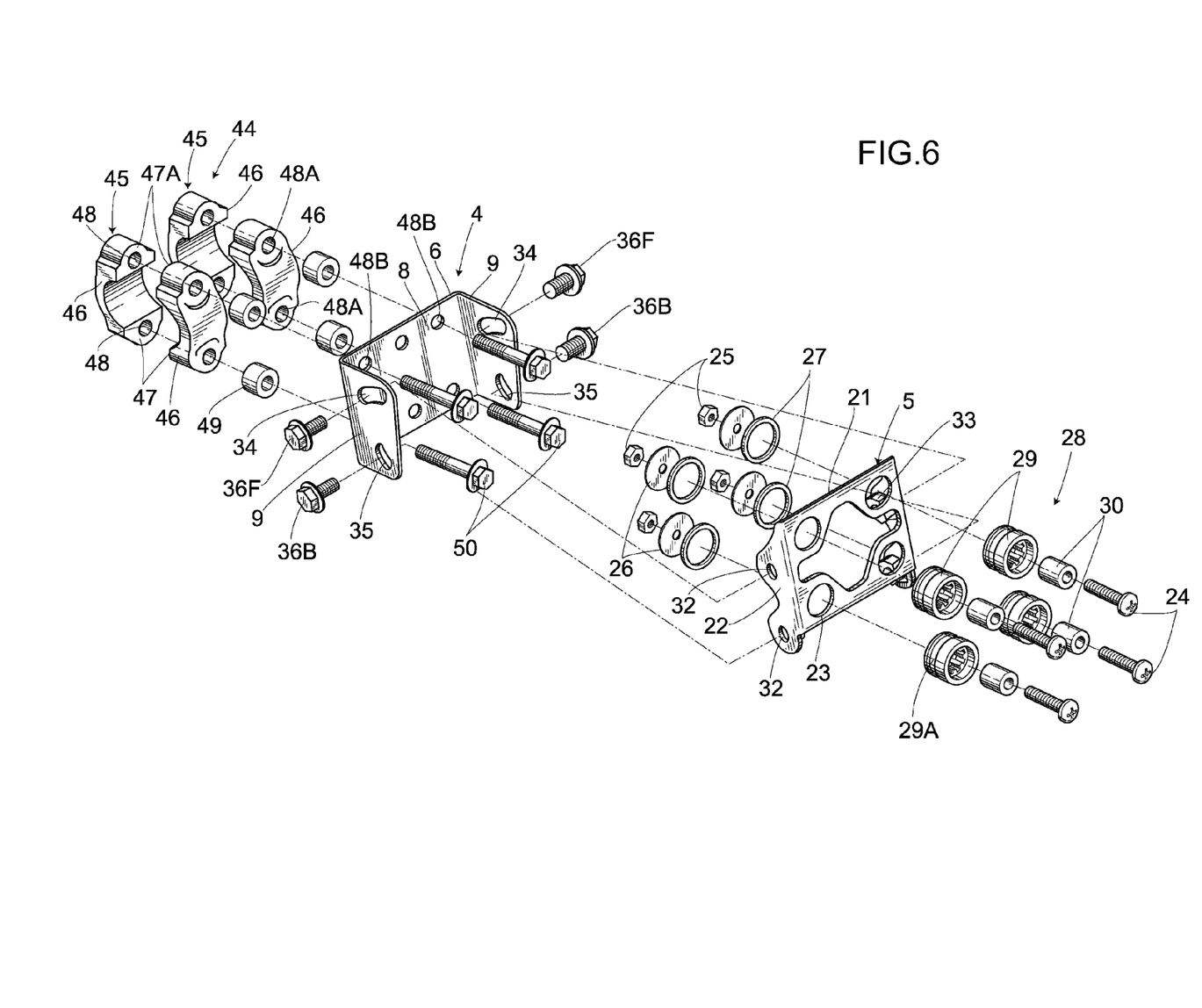
FIG. 6 is an exploded perspective view of a device according to a second embodiment.
Figure 7:
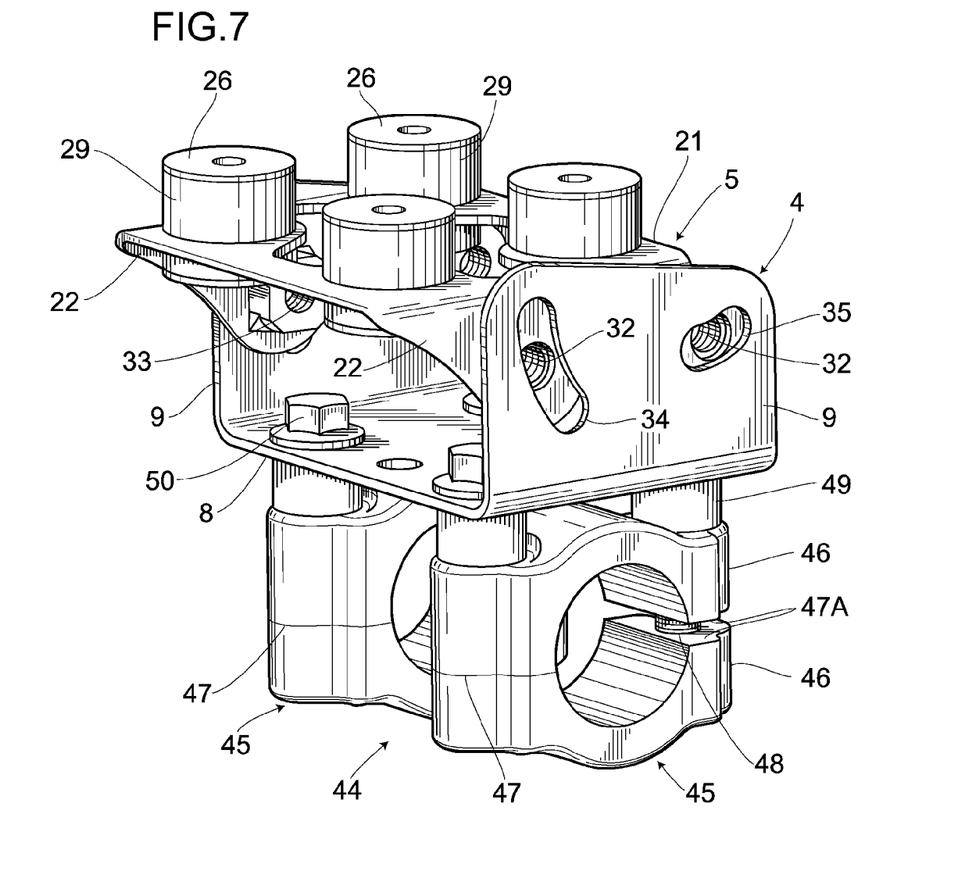
FIG. 7 is a perspective view of the device prior to mounting the electrical accessory thereto according to the second embodiment.

A second embodiment of the present invention is shown in FIG. 6 and FIG. 7. The same reference numbers are used to describe the same parts as those in the first embodiment, thereby omitting the detailed descriptions of such parts when describing the second embodiment. According to this embodiment, the fixture 4 is fixed on a steering handlebar (not shown) having a circular outer circumference, using a steering handlebar clamping means 44, instead of using the insertion portion 7 of the fixture 4 in the foregoing embodiment.

The steering handlebar clamping means 44 has a right-and-left pair of clamps 45, 45. The clamp 45 includes a pair of circular-arc-shaped split pieces 46, 46. First end faces 47 of the split pieces 46 are abutted to each other, while a space as a tightening margin is provided between second end faces 47A, 47A of the split pieces 46. Additionally, a female screw hole 48 is drilled at the end of one split piece 46, and a through-hole 48A is drilled at the end of the other split piece 46, corresponding to the one split piece 46.

Another through-hole 48B is drilled at the base 8 of the receiving portion 6, and a bolt 50 is inserted from the through-hole 48B through a cylindrical collar 49 into the through-hole 48A, and then screwed into the female screw hole 48. This causes the clamps 45, 45 to clamp the steering handlebar located between the split pieces 46, 46. Furthermore, when the bolt 50 is loosened, the angle of the steering handlebar clamping means 44 can be adjusted by rotating the fixture 4 about the steering handlebar.

As described above, according to the present embodiment, it is possible to achieve the same function and effect as the first embodiment. Specifically according to the present embodiment, the fixture 4 includes the steering handlebar clamping means 44, thus enabling the angle of the fixture 4 to the steering handlebar to be adjusted.

Third Embodiment

A third embodiment of the present invention is shown in FIG. 8 through FIG. 14. The same reference numbers are used to describe the same parts as those in the first embodiment, thereby omitting the detailed descriptions of such parts when describing the third embodiment. According to the present embodiment, modifications relating to the arrangement of a guide are described. In FIG. 8 to FIG. 11, the long holes 34, 35 are formed in a substantially linear fashion and are arranged at a predetermined angle.

Figure 8:
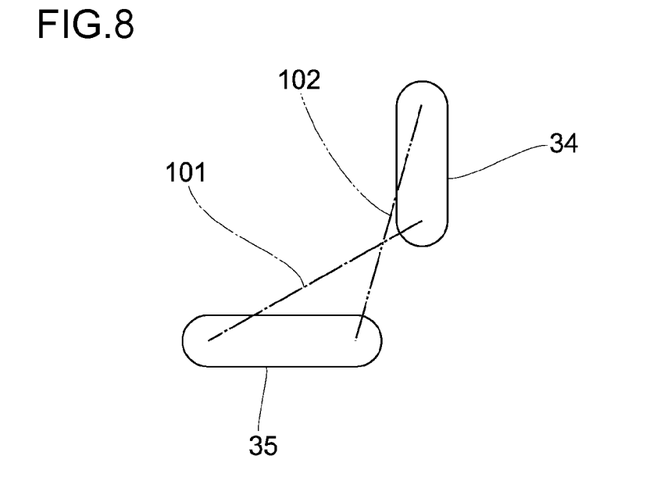
FIG. 8 is an explanatory view to explain a function of an angle setting means according to a third embodiment.

In FIG. 8, long holes 34, 35 are arranged at substantially right angles relative to each other such that when the lower side of the bracket 5 is moved forward, the navigation apparatus 20 is allowed to stand nearly upright as shown by the post-rotation imaginary line 102.

Figure 9:
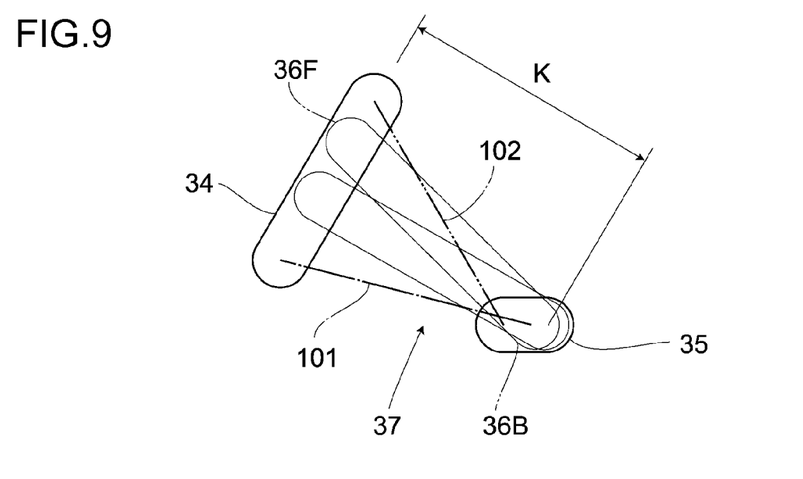
FIG. 9 is an explanatory view to explain a function of an angle setting means according to a modification of the third embodiment.

In FIG. 9, when the front-side-screw 36F is moved upward within the long hole 34 from the position of the imaginary line 101, the front-side-screw 36B slightly moves backward at first and then moves forward up to the position of the imaginary line 102.

Figure 10:
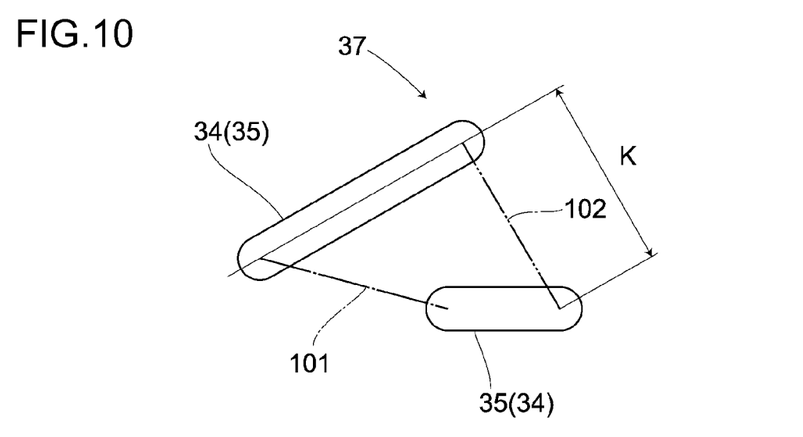
FIG. 10 is an explanatory view to explain a function of an angle setting means according to another modification of the third embodiment.
Figure 11:
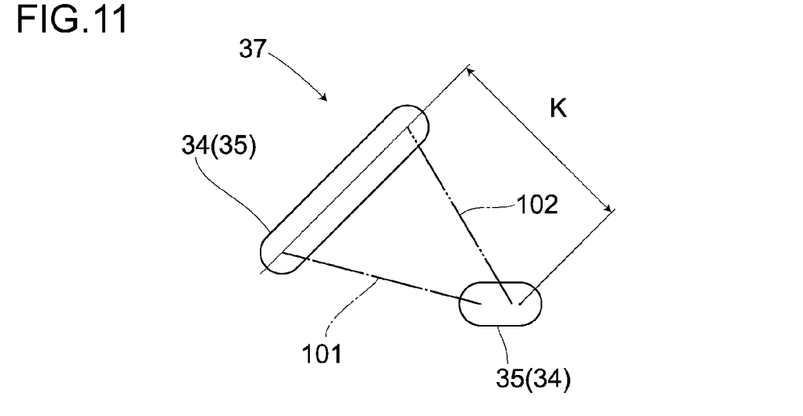
FIG. 11 is an explanatory view to explain a function of an angle setting means according to another modification of the third embodiment.

In FIG. 10, due to the post-rotation imaginary line 102 being perpendicular to the longitudinal axis of the long hole 34, the front-side-screw 36F does not move back and forth as shown in FIG. 9. On the other hand, in FIG. 11, when the front-side screw 36F moves from the position of the imaginary line 102 to the position of the imaginary line 101, the rear-side-screw 36B slightly moves backward and then moves forward. In FIG. 10 and FIG. 11, the bracket 5 is moved backward, thereby allowing the upper part of the navigation apparatus 20 to rotate backward.

Figure 12:
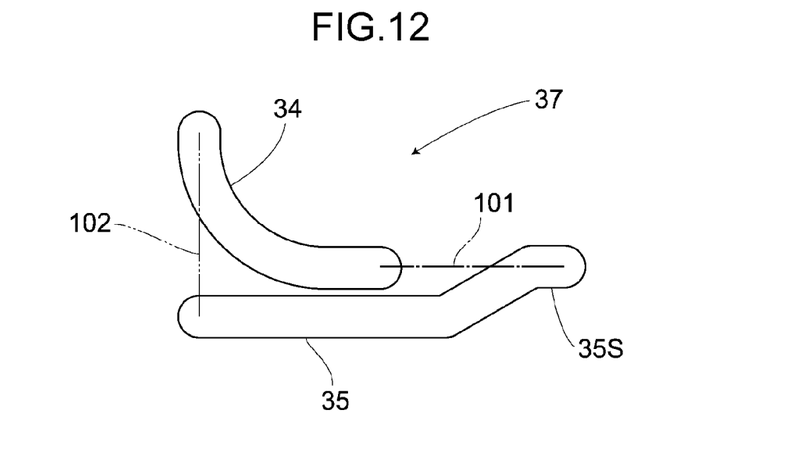
FIG. 12 is an explanatory view to explain a function of an angle setting means according to another modification of the third embodiment.
Figure 13:
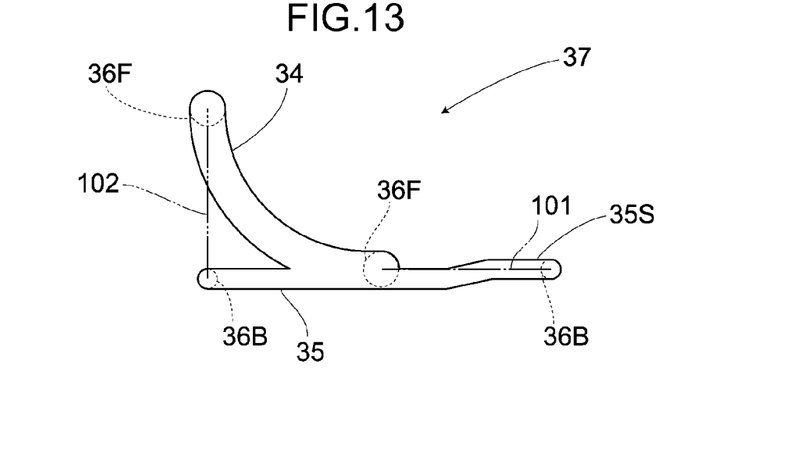
FIG. 13 is an explanatory view to explain a function of an angle setting means according to another modification of the third embodiment.

In FIG. 12 and FIG. 13, the long hole 34 is curved. In FIG. 12, both of the long holes 34, 35 are partially arranged in parallel. In FIG. 13, the width of the rear-side long hole 35 is formed narrower than that of the front-side long hole 34, and a part of the long holes 34, 35 are shared. Correspondingly, the rear-side screw 36B is formed in a smaller diameter. In this way, the widths of the long-holes 34, 35 are formed different from each other and the diameters of the screws 36F, 36B are formed in a different size such that the larger diameter screw 36F is guided along the front-side long hole 34 while the smaller diameter screw 36B is guided along the rear-side long hole 35. According to the modifications in FIG. 12 and FIG. 13, the screws 36F, 36B are allowed to move in a parallel fashion in a linear part 35S on the rear end of the rear-side long hole 35, and the navigation apparatus 20 goes flatline during the parallel movement. On the other hand, in the position of the imaginary line 102, the navigation apparatus 20 goes vertical.

Figure 14:
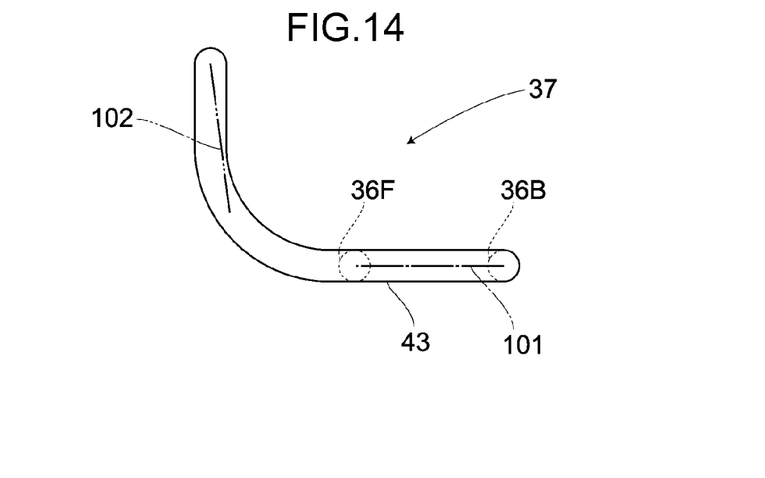
FIG. 14 is an explanatory view to explain a function of an angle setting means according to another modification of the third embodiment.

Further, in FIG. 14, it is structured such that the screws 36F, 36B are allowed to move in a single long hole 43 as a guide, and thus the screws 36F, 36B move in a parallel fashion at the lower part of the long hole 43.

In this way, through the movement along the two axes along the guide(s), various layouts become possible. As a result, the navigation apparatus 20 can be mounted according to the alignment of indicators around the steering portion 2.

As described above, according to the present embodiment, it is possible to achieve the same function and effect as the first embodiment. Specifically according to the present embodiment, as shown in FIG. 12 and FIG. 13, the angular setting means 37 is allowed to move in a parallel fashion when the bracket 5 as a holding portion is moved from back to front, and thus the navigation apparatus 20 as an electrical accessory moves in a parallel fashion, thereby allowing the position thereof to be adjusted, in accordance with the second aspect of the present invention.

Also, as shown in FIG. 14, the angular setting means 37 comprises the long hole 43 as a guide provided on the fixture 4, and the screws 36F, 36B as a pair of movement portions moving along the long hole 43, whereby, according to the second aspect of the invention, the angular setting means 37 is structured such that the upper section of the bracket 5 is allowed to rotate rearwardly of the vehicle 1 when the bracket 5 as a holding portion is moved from back to front, thus enabling the position and angle of the navigation apparatus 20 to be adjusted by rotating the navigation apparatus 20 forward.

Fourth Embodiment

A fourth embodiment of the present invention is shown in FIG. 15 through FIG. 19. The same reference numbers are used to describe the same parts as those in the first embodiment, thereby omitting the detailed descriptions of such parts when describing the fourth embodiment. According to this embodiment, a substantially rectangular fuel tank bag 52 elongated in the longitudinal direction of the vehicle 1 is mounted on a fuel tank 51 of the vehicle 1. The tank bag 52 comprises a bottom face 53, side faces 54, 54, 55, 55 on the front, back, right and left sides, and a top face 56. According to this embodiment, an openable portion 58 having a zipper 57 is provided on the front, right and left side faces 54, 55, 55 such that a cover 59 on the top of the openable portion 58 can be opened. By opening the cover 59, at least the front side face 54 can be opened.

Figure 15:
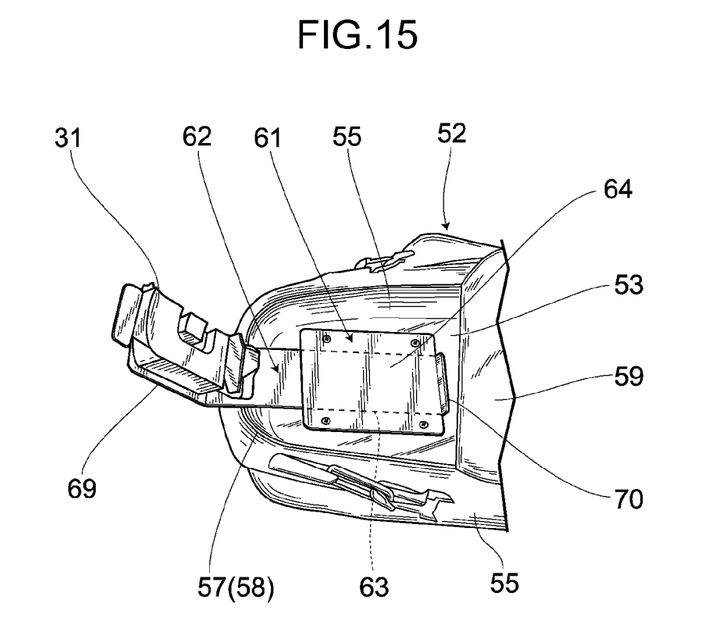
FIG. 15 is a perspective view of a device according to a fourth embodiment.

Further, the tank bag 52 is fixed on the upper front of the fuel tank by using a fastening means (not shown) such as magnet or belt.

In the inside of the tank bag 52, there is provided a fixture 61 fixed on the bottom face 53, said fixture 61 being fixed on the fuel tank 51 by mounting the tank bag 52 to the fuel tank 51, while a holding portion 62 is slidably provided on the fixture 61.

Figure 17:
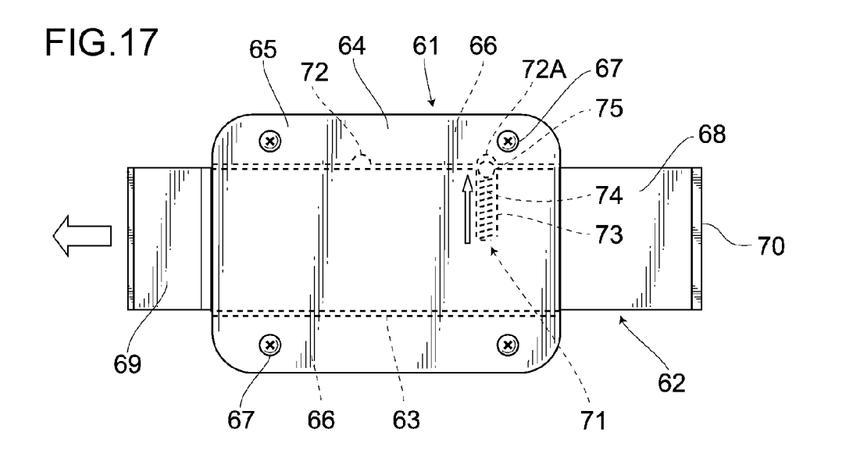
FIG. 17 is a plan view of a main section according to the fourth embodiment.
Figure 19:
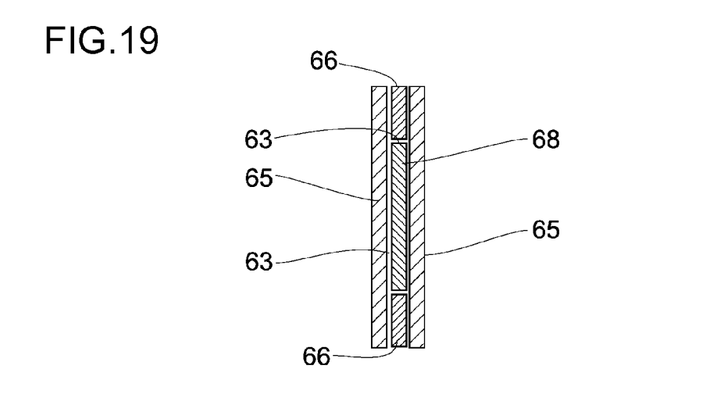
FIG. 19 is a cross-section of the main section according to the fourth embodiment.

The fixture 61 includes a base 64 having a slide hole 63 extending in the longitudinal direction of the tank bag 52. The base 64 is formed such that right and left spacer plates 66, 66 are placed between upper and lower plates 65, 65 and fixed by screws 67 thereto, thereby forming a slide hole 63 between the right and left spacer plates 66, 66.

Figure 18:
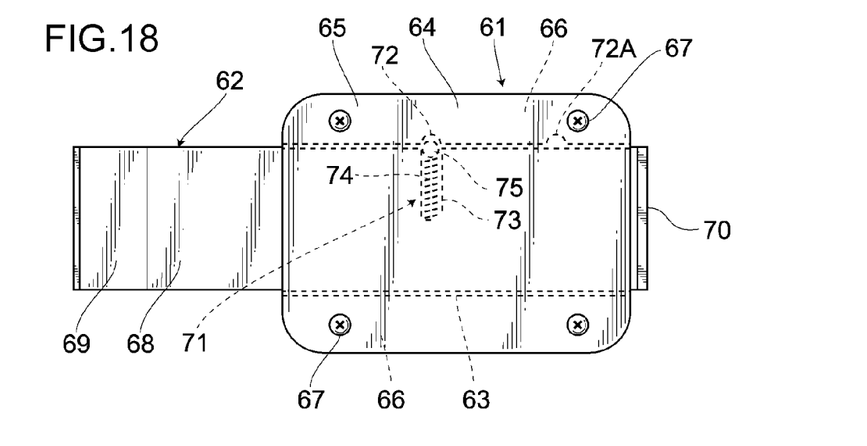
FIG. 18 is a plan view of the main section with a holding portion being moved forward according to the fourth embodiment.

The holding portion 62 has a sliding member 68 capable of sliding within the slide hole 63, and the front end of the sliding member 68 is integrally provided with an attachment portion 69 whose top face is inclined forward. And the aforesaid attachment 31 is mounted on the top face of the attachment portion 69. Further, on the rear side of the sliding member 68, there is formed a stopper 70 regulating the forward movement of the sliding member 68, said stopper 70 being formed by folding the sliding member 68. The stopper 70 engages with the rear end of the base 64, thereby limiting the further forward movement of the sliding member 68.

Moreover, a positioning means 71 is provided for positioning the holding portion 62 relative to the fixture 61. The positioning means 71 comprises front and back locking concave portions 72, 72A provided on the inner edge of the spacer plate 66, a laterally elongated concave portion 73 provided on the outer edge of the sliding member 68 corresponding to these locking concave portions 72, 72A, a compression spring 74 as a biasing means inserted into the concave portion 73, and a ball 75 as a locking insert member engageably inserted into the concave portions 72, 72A while being biased by the compression spring 74. And, when a force larger than a predetermined force is applied to the sliding member 68, the ball 75 is pushed into the concave portion 73 against the biasing force of the compression spring 74 and thus the sliding member 68 becomes movable. Thus, the positioning means 71 can position the sliding member 68 where the ball 75 is inserted into the locking concave portions 72, 72A.

Figure 16:
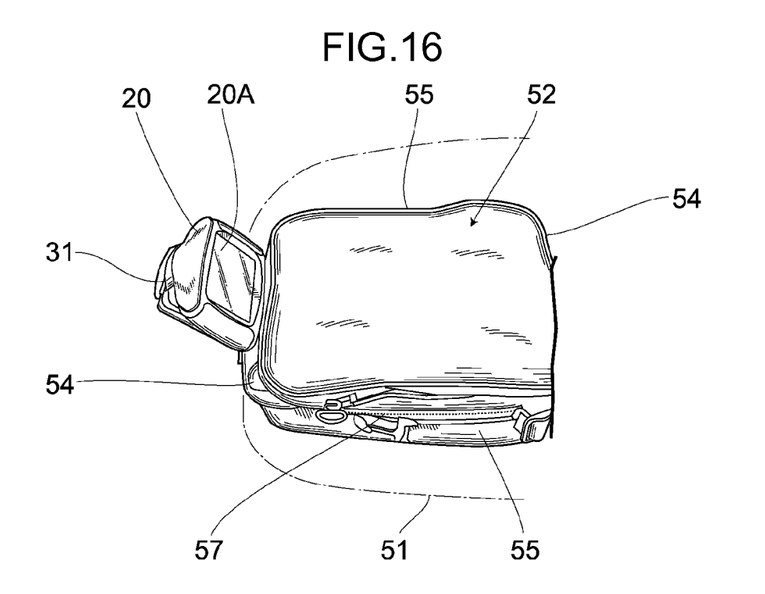
FIG. 16 is a perspective view showing the electrical accessory being out of a tank bag according to the fourth embodiment.

The locking concave portion 72 on the front side corresponds to the forward position where the navigation apparatus 20 comes forward out of the tank bag 52, and the locking concave portion 72A on the rear side corresponds to the backward position where the navigation apparatus 20 is placed in the tank bag 52. In this way, the navigation apparatus 20 can be arranged on the front of the tank bag 52 by opening the cover 59 and pulling out the apparatus 20, while the navigation apparatus 20 can be placed in the tank bag 52 with the cover 59 being closed.

As described above, according to the present embodiment, there is provided the electrical accessory mounting device for a saddle-type vehicle to mount the navigation apparatus 20 as an electrical accessory to the vehicle body 1 in front of a seat, according to the sixth aspect of the invention, comprising: the fixture 61 mounted on the fuel tank 51 of the saddle-type vehicle 1 with the tank bag 52, and the holding portion 62 holding the navigation apparatus 20, the holding portion 62 being movable relative to the tank bag 52 in a longitudinal direction of the saddle-type vehicle 1 so that it may come in and out of a front of said tank bag 52.

Accordingly, the navigation apparatus 20 can be stored in the tank bag 52 at the position where the holding portion 62 is retreated backward. Also, the navigation apparatus 20 can be used and visually recognized by advancing and taking the same out of the tank bag 52.

As such, according to the present embodiment, as depicted in the seventh aspect of the invention, the holding portion 62 comprises the sliding member 68 movable in the longitudinal direction of the vehicle 1 relative to said tank bag 52, the navigation apparatus 20 can be allowed to come in and out from the tank bag 52 by sliding the holding portion 62.

Specifically, according to the present embodiment, the electrical accessory mounting device of the present invention comprises the positioning means 71 positioning the holding portion 62 relative to the fixture 61 and thus the navigation apparatus 20 can be easily positioned at any of a use position and a storage position.

Fifth Embodiment

Figure 20:
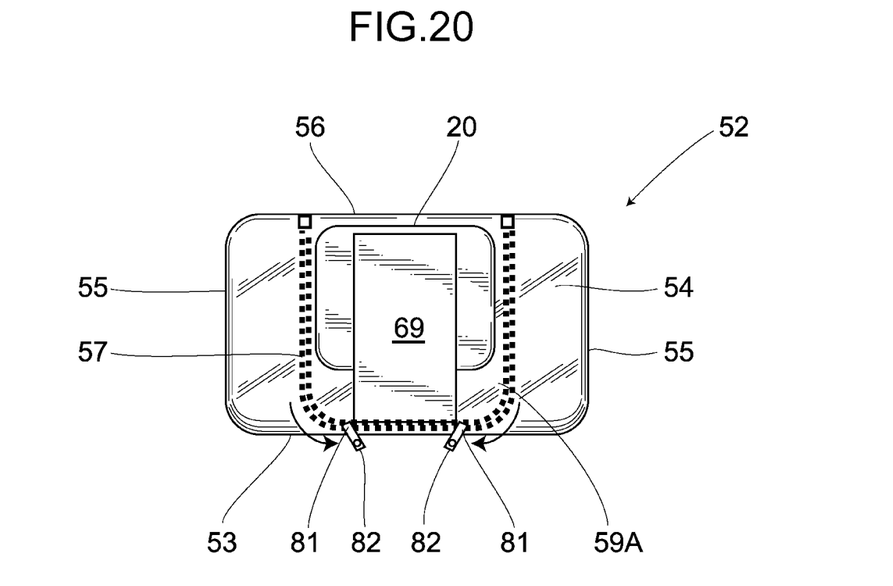
FIG. 20 is a front view showing the tank bag according to the fourth embodiment.
Figure 21:
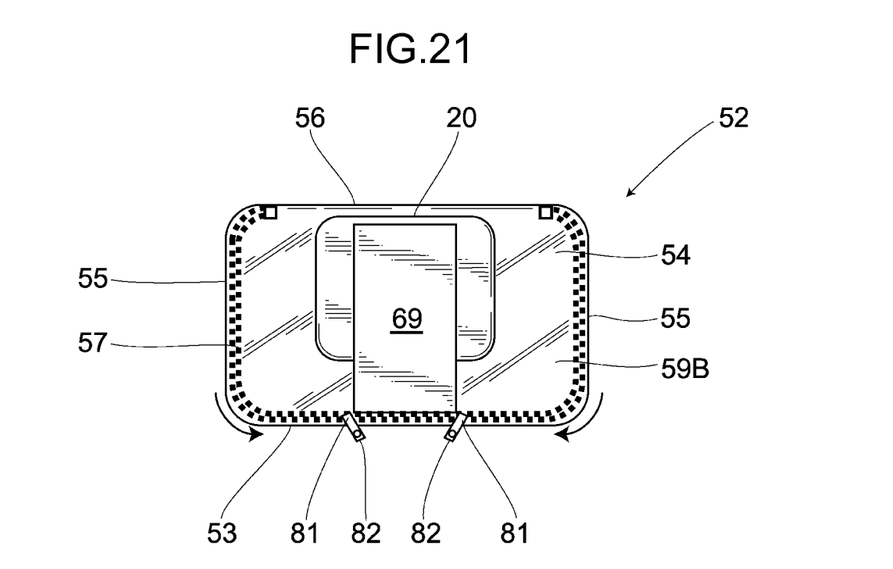
FIG. 21 is a front view showing another tank bag according to the fourth embodiment.

A fifth embodiment of the present invention is shown in FIG. 20 and FIG. 21. The same reference numbers are used to describe the same parts as those in the first embodiment, thereby omitting the detailed descriptions of such parts when describing the fifth embodiment. According to this embodiment, a modification of the tank bag 52 is shown. In FIG. 20, a substantially U-shaped cover 59A which corresponds to the width of the navigation apparatus 20 is provided on the front side face 54, and the top of the cover 59A is connected to the aforesaid top face 56. Furthermore, the zipper 57 for opening and closing the cover 59A has two opening-closing sliders 81, 81, and the slider 81 has a gripper 82 as an operation portion. As shown in FIG. 20, after the navigation apparatus 20 is taken out to the front of the tank bag 52, both sides of the cover 59A and the lower side thereof except for the part of the slide member 68 can be zipped by sliding the sliders 81, 81.

Moreover, in FIG. 21, a cover 59B is so structured that it covers almost a whole surface of the front side face 54, and the top of the cover 59B is connected to the top face 56. As shown in FIG. 21, after the navigation apparatus 20 is taken out to the front of the tank bag 52, both sides of the cover 59B and the lower side of the cover 59B except for the part of the slide member 68 can be zipped by sliding the sliders 81, 81.

The present invention is not limited to the aforementioned embodiments. Various embodiments are possible without departing from the spirit and scope of the present invention. For example, vehicles referred to as the saddle-type vehicle of the invention may include any two-wheeled vehicles, snowmobiles and four-wheeled motorcycles. In addition, those referred to as the electrical accessory may include various things other than the navigation apparatus, and the present invention is preferably applicable to those having a display portion.

What is claimed is:

1. An electrical accessory mounting device for a saddle-type vehicle, said device comprising:
   a fixture mounted on a steering pipe of the saddle-type vehicle;
   a holding bracket attached to an upper side of the fixture and configured to hold an electrical accessory on an upper portion thereof; and
   an angular setting means configured to make at least part of said holding bracket movable relative to said fixture in a longitudinal direction of the saddle-type vehicle, and to set an angle of said holding bracket to a predetermined angle according to a position corresponding to the movement of said holding bracket in the longitudinal direction,
   wherein said fixture includes a receiving portion receiving said holding bracket in a position-adjustable manner, said receiving portion comprising a base portion and first side plates provided integrally with said base portion on both sides of said base portion and being formed in a U-shape whose upper portion is open,
   said holding bracket comprises an attachment portion configured to attach said electrical accessory thereto and second side plates provided integrally with said attachment portion on both sides of said attachment portion and has an inverted U-shape whose lower portion is open, and
   said angular setting means comprises a pair of guides provided on one of said first side plates of said fixture and said second side plates of said holding bracket, and a pair of movement portions provided on the other of said first side plates of said fixture and said second side plates of said holding bracket portion, said movement portions configured to move along a pair of said guides.

2. The electrical accessory mounting device for a saddle-type vehicle according to claim 1, wherein said angular setting means is configured to allow said holding bracket to move in parallel or an upper section thereof to rotate rearwardly of the vehicle when said holding bracket is moved from back to front.

3. The electrical accessory mounting device for a saddle-type vehicle according to claim 1, wherein said pair of guides comprises an elongated opening and said movement portion is a screw configured to move along said long hole.

4. The electrical accessory mounting device for a saddle-type vehicle according to claim 1, wherein said pair of guides comprises an elongated opening and said movement portion is a screw configured to move along said long hole.

5. The electrical accessory mounting device for a saddle-type vehicle according to claim 1, wherein said pair of said guides comprise a first guide and a second guide each having an elongated opening, wherein a main axis of the first guide is generally perpendicular to a main axis of the second guide.

6. The electrical accessory mounting device for a saddle-type vehicle according to claim 1, wherein said pair of said guides comprise a first guide and a second guide each having an elongated opening, wherein a main axis of the first guide is generally perpendicular to a main axis of the second guide.

7. The electrical accessory mounting device for a saddle-type vehicle according to claim 3, wherein said pair of said guides comprise a first guide and a second guide each having an elongated opening, wherein a main axis of the first guide is generally perpendicular to a main axis of the second guide.

8. The electrical accessory mounting device for a saddle-type vehicle according to claim 4, wherein said pair of said guides comprise a first guide and a second guide each having an elongated opening, wherein a main axis of the first guide is generally perpendicular to a main axis of the second guide.

9. The electrical accessory mounting device for a saddle-type vehicle according to claim 1, wherein said fixture includes an insertion portion which is inserted into said steering pipe and fixed thereto.

10. The electrical accessory mounting device for a saddle-type vehicle according to claim 9, wherein said insertion portion includes an insertion pipe formed on said base portion at a center of a bottom face thereof and a nut body provided at a bottom of said insertion pipe, said insertion pipe having a first inclined surface obliquely formed at a lower end thereof, said nut body having a second inclined surface which is formed so as to correspond to said first inclined surface at an upper portion thereof.

* * * * *